Aug. 3, 1954

C. L. BUTLER 2,685,095

PIPE THREADING APPARATUS

Filed March 12, 1952

Charles L. Butler
INVENTOR.

BY *Clarence A.O'Brien*
*and Harvey B. Jackson*
Attorneys

Aug. 3, 1954     C. L. BUTLER     2,685,095
PIPE THREADING APPARATUS
Filed March 12, 1952     4 Sheets-Sheet 2
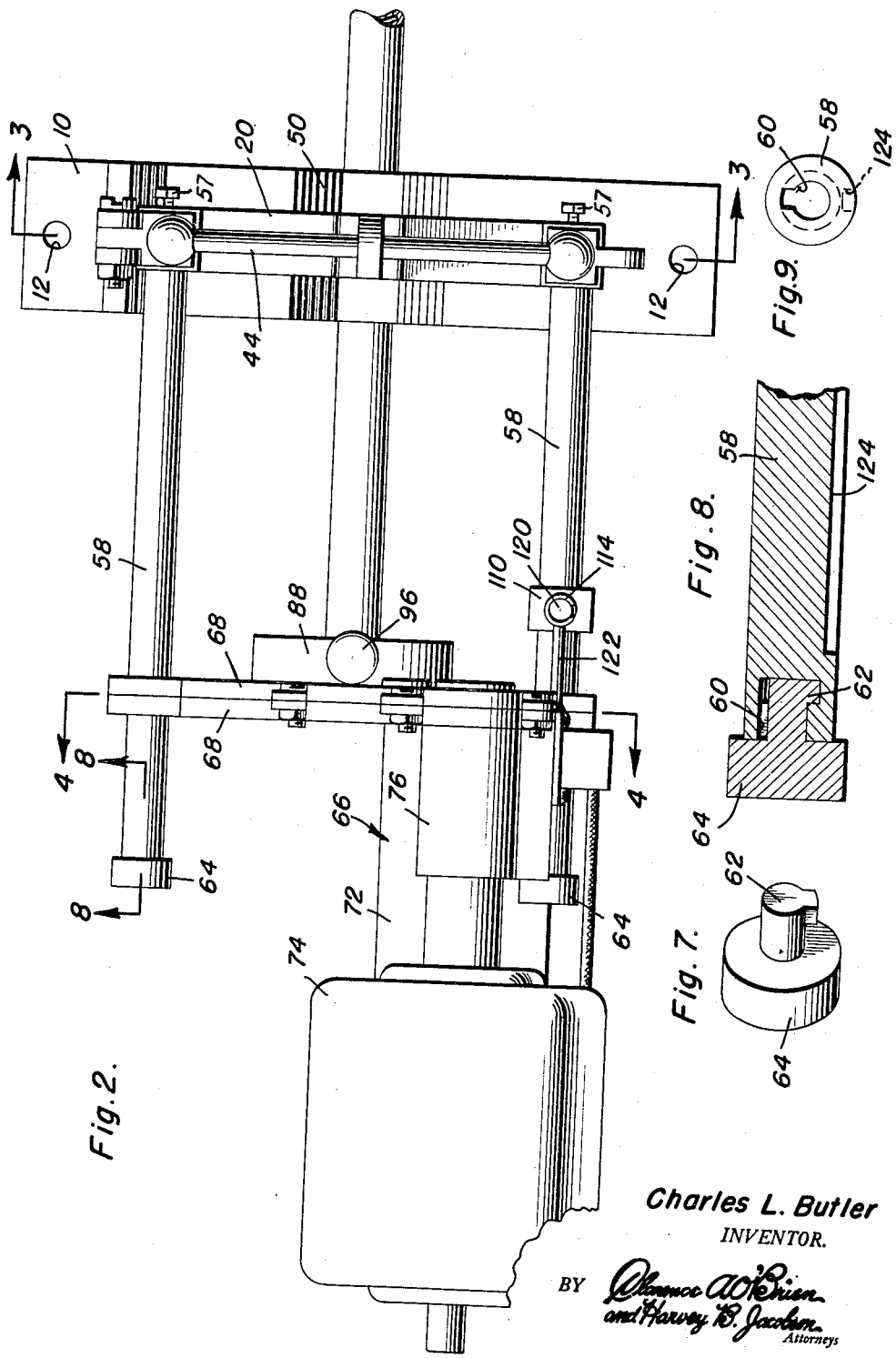
Charles L. Butler
INVENTOR.

Aug. 3, 1954　　　　C. L. BUTLER　　　　2,685,095
PIPE THREADING APPARATUS
Filed March 12, 1952　　　　　　　　　　　　4 Sheets-Sheet 3
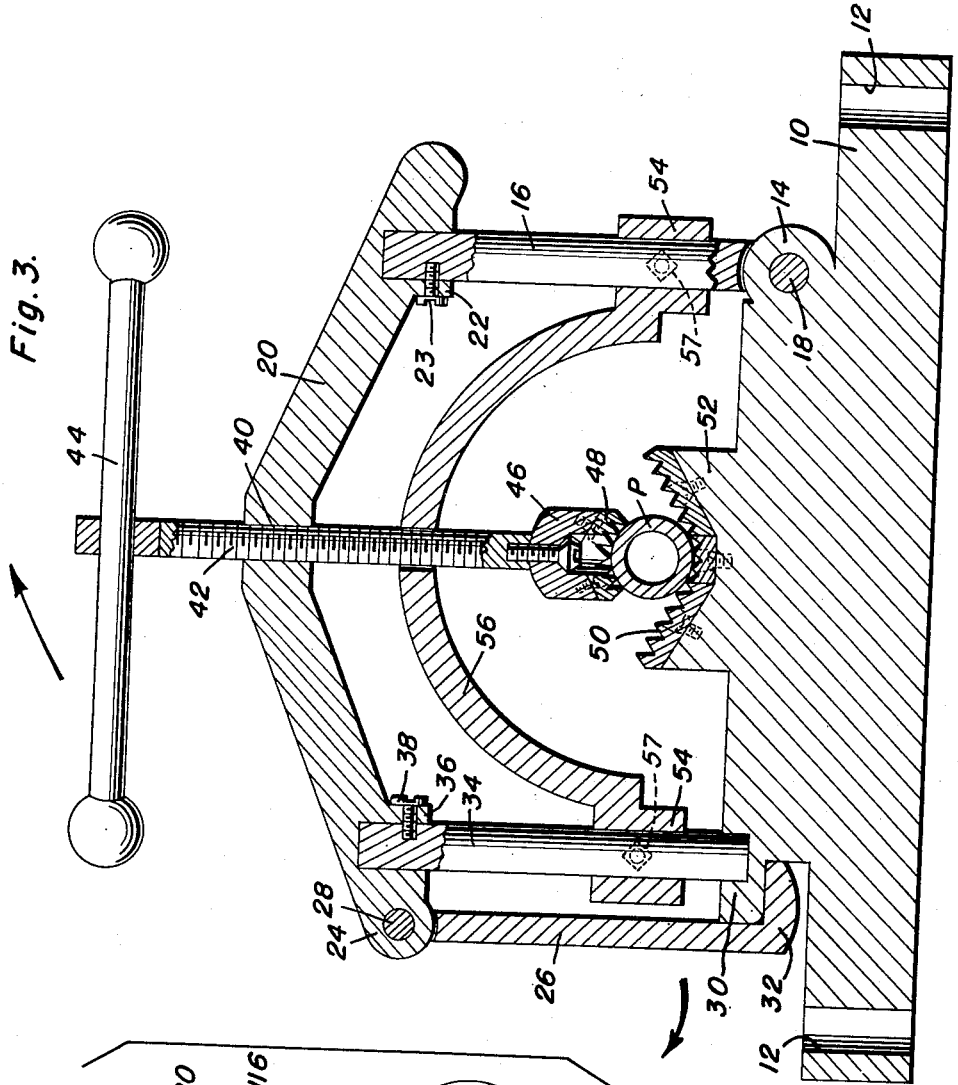
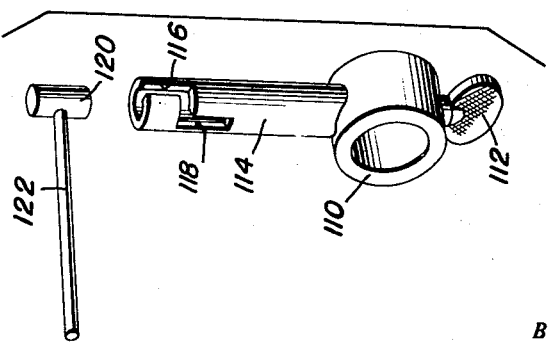
Charles L. Butler
INVENTOR.

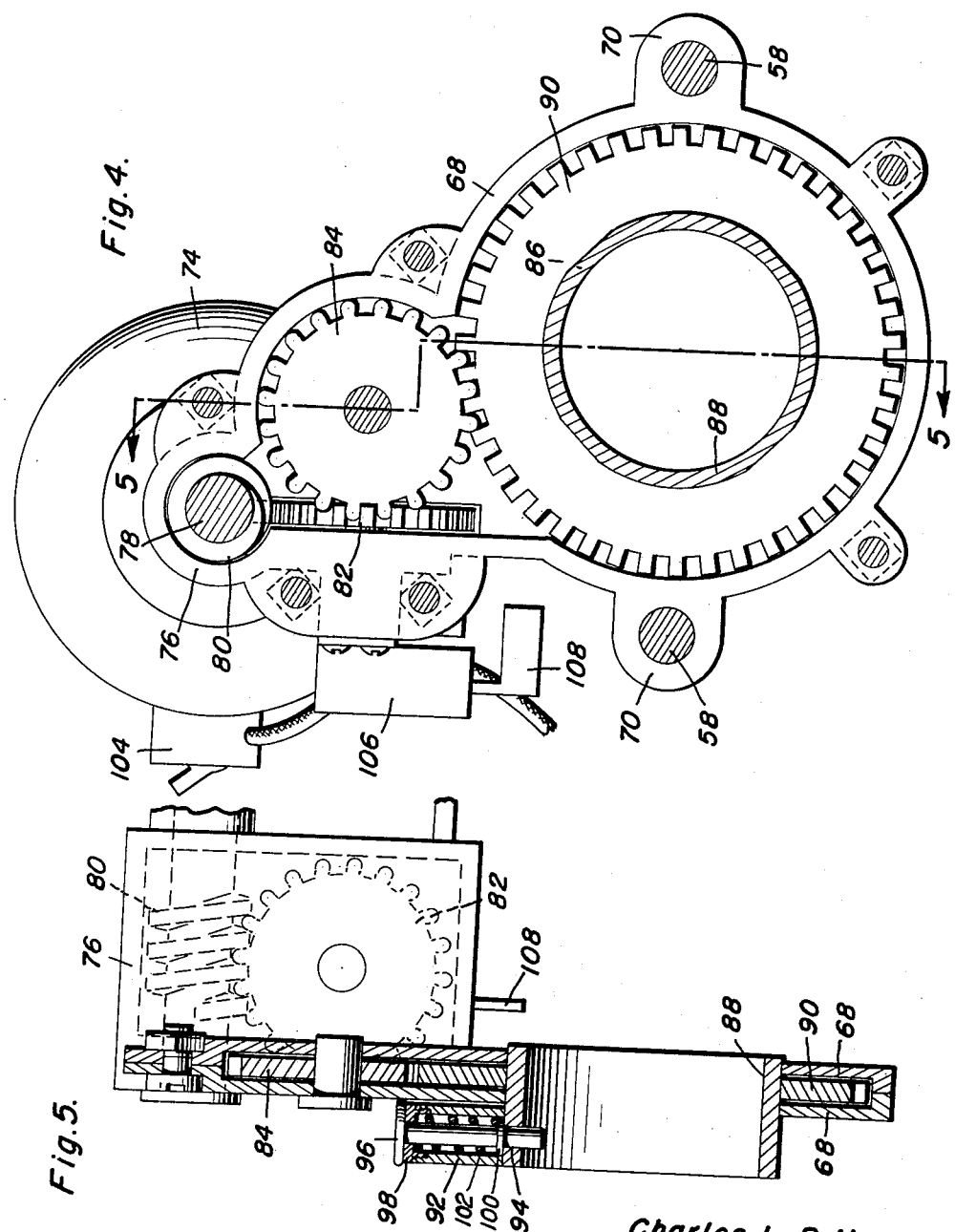

Patented Aug. 3, 1954

2,685,095

UNITED STATES PATENT OFFICE 2,685,095

PIPE THREADING APPARATUS

Charles L. Butler, Dallas, Tex., assignor of twelve per cent to Donald E. Saffell and twelve and one-half per cent to Louise B. Saffell, both of Dallas, Tex.

Application March 12, 1952, Serial No. 276,075

6 Claims. (Cl. 10—89)

This invention relates to new and useful improvements in pipe threading apparatus and the primary object of the present invention is to provide a pipe threading device for converting manually operated die heads, of the ratchet type, to automatic machine threading for the purpose of threading pipe or rods.

Another important object of the present invention is to provide a portable pipe threading device adapted for attachment to and operation by the pipe rack of pickup trucks, as well as benches and which device may be easily carried into or under houses, building structures or the like for the threading of pipes or rods.

A further object of the present invention is to provide a threading device that is extremely small and compact in structure and which includes a power driven die holder supported on a carriage and having a limiter switch adapted to be engaged by an adjustable stop, whereby the threading operation may be arrested automatically.

A still further aim of the present invention is to provide a threading apparatus for pipes, rods and the like that is simple and practical in construction, strong and reliable in use, efficient and durable in operation, inexpensive to manufacture, one that may be carried, moved and operated by only one man, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a plan view of Figure 1;

Figure 3 is an enlarged transverse vertical sectional view taken substantially on the plane of section line 3—3 of Figure 2;

Figure 4 is an enlarged transverse vertical sectional view taken substantially on the plane of section line 4—4 of Figure 2;

Figure 5 is a vertical sectional view taken substantially on the plane of section line 5—5 of Figure 4;

Figure 6 is a group perspective view of the limiter switch abutment;

Figure 7 is a perspective view of the locking means for retaining the carriage on the guide rods therefor;

Figure 8 is an enlarged vertical sectional view taken substantially on the plane of section line 8—8 of Figure 2; and, Figure 9 is an end view of Figure 8.

Figure 1:
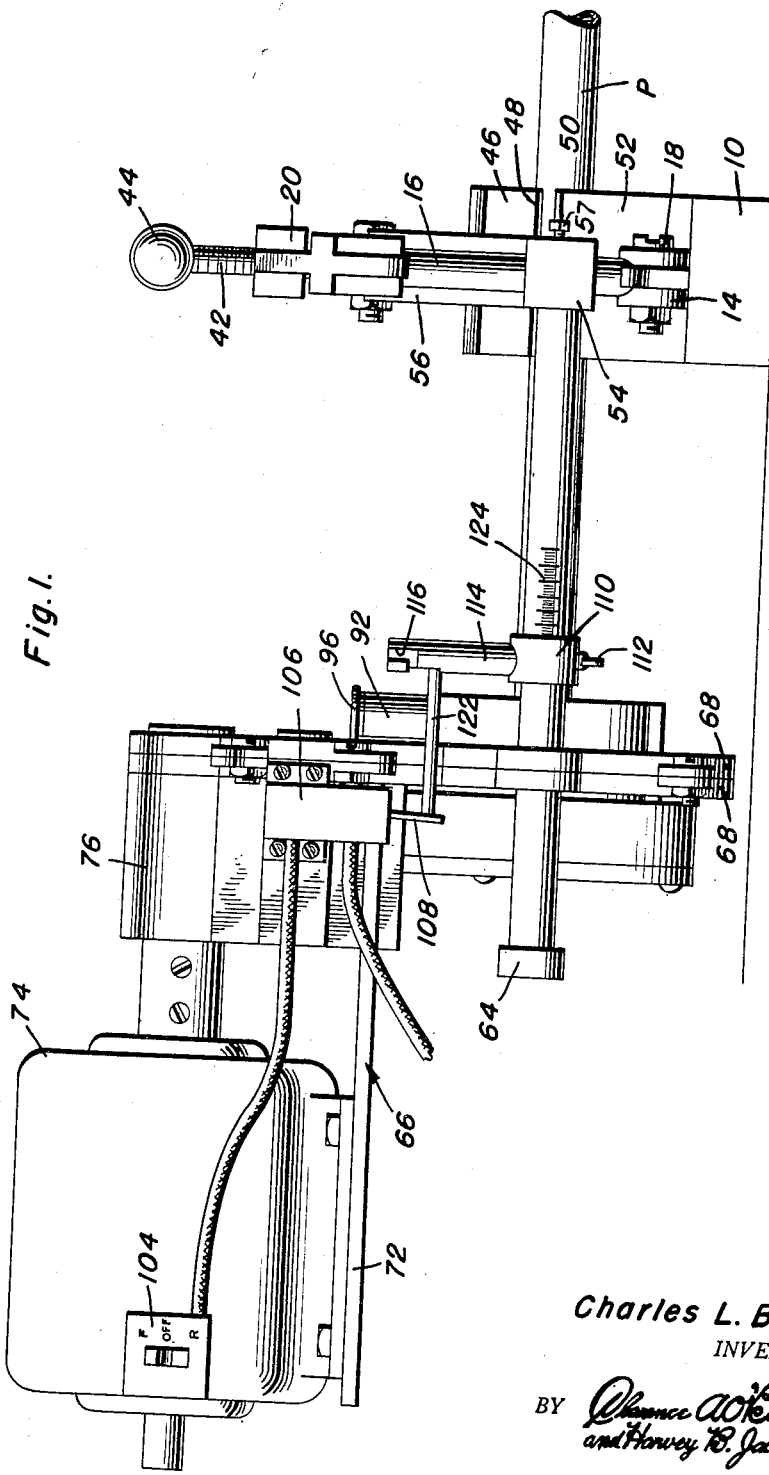
Figure 1 is a side elevational view of the present invention in use.

Referring now to the drawings in detail, wherein for the purpose of illustration, there is disclosed a preferred embodiment of the present invention, the numeral 10 represents an elongated base having end apertures 12 adapted to receive fasteners, whereby the base may be removably secured to a supporting structure, such as a bench or rack of pickup trucks.

A pair of spaced ears 14 are formed on the base adjacent one end of the base and receive the lower apertured end of a rod or post 16 therebetween. A pivot 18 extends through the lower end of rod 16 and the ears 14 to permit vertical swinging movement of the rod 16 on the base 10. The upper end of rod 16 enters a recess in the undersurface of one end of a cross-member 20. An internally threaded ear 22 also depends from this end of cross-member 20 and receivably engages a fastener 23 that is threaded in a recess in the upper end of the rod 16.

The other end of cross-member 20 is formed with an ear 24 that extends into the bifurcated upper end of a latch member 26. A pivot pin 28 extends through the bifurcated end of latch member 26 and the ear 24. A lip 30 on the base receives the hook portion 32 of the latch member thereunder, to hold the rod 16 against pivotal movement.

The lower end of a second rod 34 is positioned in a recess in the base and the rod 34 extends upwardly from the base and into a recess in the undersurface of the cross-member 20 adjacent the latch member 26. A relatively small internally threaded ear 36 depends from cross-member 20 adjacent the upper end of rod 34 and receivably engages a fastener 38 that threadingly enters a transverse recess in the rod 34.

Cross-member 20 is provided with a central, internally threaded hole 40 that receivably engages a feed screw 42 whose upper end carries a hand grip 44. A sleeve 46 is secured to the lower end of screw 42 and removably supports a toothed gripper 48 that faces a sectional V-shaped stationary gripper 50 mounted in a transverse saddle 52 on the base.

The outwardly turned vertically apertured ends 54 of a U-shaped brace 56 receive the rods 16 and 34 to retain the rods parallel to each other. The brace 56 is centrally apertured to receive screw 42 the aperture being smooth or unthreaded to permit vertical movement of the screw 42 without effecting movement of the brace.

Ends 54 of brace 56 are provided with horizontal recesses in which a pair of spaced parallel horizontal guide rails or bars 58 are suitably held. The ends of the rails 58 remote from the base 10 are provided with key shaped blind bores 60 that releasably receive the key shaped shanks 62 of stop members or butt-keys 64.

A carriage 66 is slidably received on the guide rails 58 for movement toward and away from the base 10. Carriage 66 includes a pair of casing forming members 68 that are removably secured together. The members 68 are formed with diametrically opposed ears 70 that slidably receive the guide rails.

The carriage 66 also includes a horizontal motor mounting plate 72 on which a reversible electric motor 74 is suitably mounted. A gear box 76 on the plate 72 receives the armature shaft 78 of the motor and a worm 80 fixed on shaft 78. A gear 82 rotatably in box 76 meshes with worm 80 and also meshes with a pinion 84 between casing forming members 68.

The members 68 are provided with registering openings 86 that rotatably support a sleeve 88 having a ring gear 90 fixed thereon. Gear 90 is interposed between the members 68 and meshes with the pinion 84. It is noted that the opening in gear 90 is formed with circumferentially spaced flat portions corresponding to circumferentially spaced flat portions on the sleeve 88, whereby sleeve 88 and ring gear 90 rotate as a unit.

A tube 92 is fixed to sleeve 88 about an aperture 94 in the sleeve. A plunger 96 is slidably carried by a cap 98 threaded to the tube and extends through aperture 94. A shoulder 100 on the plunger is urged against the sleeve 88 by a coil spring 102 that embraces the plunger and which is biased between the shoulder 100 and the cap 98.

Motor 74 is provided with the usual switch 104 whereby the motor shaft may be rotated clockwise or counterclockwise or the circuit to the motor opened. The motor 74 is also provided with a limiter switch 106 having an operating arm 108.

Stop means is provided for the carriage in the form of an abutment for the arm 108 of the limiter switch 106. This stop means comprises a collar 110 slidably received on one of the guide rails. A set screw 112 threaded through the collar will engage the rail on which the collar is slidably received to adjust the collar longitudinally on the rail.

A tubular post 114 extends upwardly from the collar 110 and its upper end is formed with a vertical slot 116 having a lower offset portion 118. The transverse cylindrical head portion 120 of a stop rod 122 is received in the upper end of post 114 and the rod 122 is moved downwardly in slot 116 to enter portion 118 thereof at which time rod 122 will parallel the guide rails and be disposed in the path of the arm 108.

Scale markings or graduations are provided on the rail slidably receiving the collar 110 so that the length of a pipe P to be threaded may be readily determined.

In practical use of the present invention a die (not shown) is releasably secured in the sleeve 88 and the collar 110 is adjusted to the desired length of thread cut by tightening set screw 112 in a longitudinal groove 124 in the graduated rail 58.

Latch member 26 is removed from lip 30 and cross-member 20 swung back on pivot 18 to permit pipe P to be placed on jaws 50. Cross-member 20 is then lowered and latch member 26 engaged with lip 30. Screw 42 is next lowered until jaw 48 engages the pipe to clamp the pipe between jaws 48 and 50.

Switch 104 is manually actuated to place its button in its forward position whereupon the die engaged with the end of pipe P remote from base 10 will be driven to cut threads in the pipe and also move the carriage 66 toward the base. Movement of the carriage continues until rod 122 is engaged by arm 108 whereupon the circuit to the motor will be broken.

The ends 54 of the brace 56 carry set screws that engage the rods 16 and 34 to permit vertical adjustment of the brace and the rails 58 supported thereon, whereby the device is adjustable to pipes of various diameters.

To remove the die head from the pipe, the switch 104 is placed in a reverse position and arm 122 is swung to a position at right angles to the guide rails to permit closing of switch 106. Then, the motor will rotate counterclockwise thus reversing rotation of the die or dies and unscrewing them from the pipe. The switch 104 is manually urged to its circuit open position to arrest operation of the motor.

Cross-member 20 is then tilted by backing up on screw 42 and disengaging latch member 26 from lip 30 and the pipe raised from jaw 50. The pipe may also be withdrawn from the rear of the vise 48, 50 without having to tilt cross-member 20 provided the next pipe to be threaded is substantially the same diameter as that in which the threads were previously cut.

Obviously if left hand threads are to be cut in the pipe the dies used will be left handed and the switch 104 will be placed in reverse designation for the threading of the pipe counterclockwise and switch 104 will be placed in a forward designation for removal of the dies from the pipe, clockwise.

For the threading of one end of a length of pipe when the opposite end is in a fixed position and can not be removed from its connection at that end, such as an underground pipe, the guide end of a die head, containing the proper dies for the diameter of the pipe is first placed within the dies stock or sleeve 88. The vice including the base are clamped on the pipe and the steps previously outlined above followed to cut threads in the pipe for a predetermined length.

Having described the invention, what is claimed as new is:

1. A pipe threading machine comprising a base, a pair of parallel horizontal guide rails vertically adjustable supported relative to the base and projecting outwardly therefrom, means carried by the base for clamping pipes of relatively different diameters thereto in parallel relation with the guide rails, a carriage slidably supported on the rails and vertically adjustable thereby, and a power driven die rotatably supported by the carriage and vertically adjustable thereby into axial alignment with the pipes of different diameters for engaging and cutting threads in a pipe held by said means and thereby causing movement of the carriage along the rails and toward the base.

2. A pipe threading machine comprising a base, clamping means carried by the base for clamping pipes of relatively different diameters thereto and including a pair of posts, a pair of horizontal guide rails vertically adjustably carried by said posts, a carriage slidably supported on the rails and vertically adjustable thereby, a pipe thread cutting die rotatably supported on the carriage and vertically adjustable thereby into axial alignment with the pipes of different diameters for cutting threads in a pipe held relative to said base by said clamping means and thereby causing movement of the carriage on the guide rails toward the base, an electric motor mounted on the carriage and operatively connected to said die for rotating the same, said motor including a switch having an operator arm movable with the carriage, and a stop means mounted on one of said rails in the path of movement of the operator arm for engaging said arm to move the switch to its circuit open position as the carriage is moved toward said stop means.

3. The combination of claim 2 wherein said stop means includes a collar slidably and adjustably received on said one rail, a post fixed to and rising from said collar, and a horizontal actuator rod detachably secured to said post and paralleling said rails and located in the path of movement of said arm.

4. The combination of claim 3 wherein said post comprises a tube having a vertical slot in its upper end including an offset lower end portion, said rod including an enlarged cylindrical head portion received in the tube, said rod being passed through the slot and into the lower offset end portion.

5. A pipe threading machine comprising a base, a pair of parallel guide rails vertically adjustably supported relative to the base and projecting outwardly therefrom, means carried by the base for clamping a pipe thereto in parallel relation with the guide rails, a carriage slidably supported on the rails, and a power driven die releasably supported by the carriage for engaging and cutting threads in a pipe held by said means and thereby causing movement of the carriage along the rails and toward the base, said means comprising a vertically swingable bar pivoted to the base, a cross-member having one end secured to the bar, a second bar secured to the base and also secured to the other end of the cross-member, latch means carried by the cross-member, engaging the base to prevent movement of the cross-member and the swingable bar about the pivot of the swingable bar, a brace vertically slidably adjustably received on the bars and supporting the guide rails, and said means for clamping comprising a pressure element adjustably carried by the cross-member and slidably carried by the brace.

6. A pipe threading apparatus comprising a base having means thereon for clampingly holding a pipe in a horizontal position, a pair of spaced parallel horizontal guide rails, a carriage slidably received on the rails and movable toward and away from the base, and die means supported on the carriage for cutting threads in a pipe held on said base and for moving the carriage on the rails as the die cuts threads in a pipe, said means for clampingly holding a pipe comprising a cross-member having one end pivotally attached to the base, latch means at the other end of said cross-member releasably engaging the base, a pair of posts carried by said cross-member, a brace vertically adjustably carried by said post and supporting said rails, a pressure element carried by the cross-member, and a pipe seat secured to the base and opposing the pressure element.

References Cited in the file of this patent

UNITED STATES PATENTS

| Number | Name | Date |
|---|---|---|
| 771,147 | Henderer | Sept. 27, 1904 |
| 944,584 | Treadwell | Dec. 28, 1909 |
| 1,005,966 | Hart | Oct. 17, 1911 |
| 1,852,776 | Hodeaux | Apr. 5, 1932 |
| 2,219,944 | Schoepe | Dec. 29, 1940 |
| 2,314,016 | Peters | Mar. 16, 1943 |
| 2,576,114 | Hibbard | Nov. 27, 1951 |